United States Patent [19]

Takahashi et al.

[11] Patent Number: 5,317,555

[45] Date of Patent: May 31, 1994

[54] OPTICAL HEAD DEVICE UTILIZING PARTIALLY OVERLAPPING LIGHT SPOTS TO READ INFORMATION FROM A READOUT LAYER

[75] Inventors: Akira Takahashi, Nara; Yoshiteru Murakami, Nishinomiya; Junsaku Nakajima, Yamatotakada; Kenji Ohta, Nara, all of Japan

[73] Assignee: Sharp Kabushiki Kaisha, Osaka, Japan

[21] Appl. No.: 910,837

[22] Filed: Jul. 8, 1992

[30] Foreign Application Priority Data

Jul. 8, 1991 [JP] Japan .................................. 3-167205

[51] Int. Cl.⁵ .............................................. G11B 13/04
[52] U.S. Cl. ........................................ 369/110; 369/13
[58] Field of Search .................. 369/13, 110, 121, 100, 369/122; 360/59; 365/122

[56] References Cited

U.S. PATENT DOCUMENTS 5,051,970  9/1991  Ishii et al. ............................. 369/13
5,093,822  3/1992  Kugiya et al. ....................... 369/121
5,168,482  12/1992  Aratani et al. ........................ 369/13

FOREIGN PATENT DOCUMENTS

4018275A1  12/1990  Fed. Rep. of Germany .

OTHER PUBLICATIONS

Co-pending application, U.S. Patent Application Ser. No. 07/870,630 filed Apr. 16, 1992.
Co-pending application, U.S. Patent Application Ser. No. 07/909,969 Filed Jul. 7, 1992.
Co-pending application, U.S. Patent Application Ser. No. 07/910,678 filed Jul. 8, 1992.
"Read Out Mechanism of Magnetically Induced Super Resolution" (Proceedings of Magneto-Optical Recording International Symposium 1991, J. Magn. Soc. Jpn., vol. 15, Supplement No. S1 (1991), pp. 319-322).

Primary Examiner—Paul M. Dzierzynski
Assistant Examiner—James Beyer
Attorney, Agent, or Firm—David G. Conlin; Robert F. O'Connell

[57] ABSTRACT

A magneto-optical disk has a recording layer whereon recorded bits are formed by the magnetic field modulation method and a readout layer whose axis of easy magnetization is parallel to the recording layer at room temperature, and varies to be perpendicular to the recording layer within a predetermined temperature range between room temperature and the Curie temperature. During reproduction of the recorded bits the first semiconductor laser emits a heating-use light beam to form the first light spot on the readout layer Thus, a ring-shaped region corresponding to the predetermined temperature range exhibits perpendicular magnetic anisotropy and the recorded bits are copied from the recording layer onto the ring-shaped region. As the first light spot is shifted, the ring-shaped region as a readout window of recorded bits is also shifted. Further, the second semiconductor laser emits a reproduction-use light beam such that the second light spot is formed on the readout layer to overlap the first light spot at a rear portion thereof. Consequently, only one recorded bit copied onto the rear portion of the ring-shaped region can be reproduced; therefore, high-quality reproduced signals can be obtained from the magneto-optical disk having information recorded with high density.

9 Claims, 8 Drawing Sheets

OPTICAL HEAD DEVICE UTILIZING PARTIALLY OVERLAPPING LIGHT SPOTS TO READ INFORMATION FROM A READOUT LAYER

FIELD OF THE INVENTION

The present invention relates to an optical head device for reproducing information from a magneto-optical recording medium, such as a magneto-optical disk, a magneto-optical tape or a magneto-optical card.

BACKGROUND OF THE INVENTION

The recording density of an optical storage device including magneto-optical disks is dependent on the size of a light spot formed on the recording medium by a light beam which is used for recording and reproducing. Recently, a reproduction method has been proposed for reproducing recorded bits with sizes smaller than the size of a light beam.

Normally, the light beam for use in optical recording is converged to a diffraction limit by a converging lens; therefore, the light intensity distribution shows a Gaussian distribution, and thus the temperature distribution on the recording medium also exhibits a virtual Gaussian distribution. As a result, a portion on the recording medium having a temperature that is not less than a predetermined temperature become smaller in size than the size of the light spot. Consequently, the recording density can be greatly improved if only this portion can be utilized for reproduction.

Referring to FIG. 13, the following description will discuss a magneto-optical disk wherein a recorded bit with a size smaller than the size of a light spot can be reproduced.

The magneto-optical disk is mainly constituted by a readout layer 30 and a recording layer 31. The recording layer 31 has a great coercive force at room temperature. On the other hand, the readout layer 30 has a small coercive force at room temperature. When the temperature of a portion of the readout layer 30 to be reproduced is raised by irradiation of a light beam, the direction of the magnetization of the readout layer 30 becomes coincident with the direction of the magnetization of the recording layer 31 due to the effect of the recording layer 31. That is, the magnetization of the recording layer 31 is copied onto the readout layer 30 by an exchange coupling force between the readout layer 30 and the recording layer 31.

In the above arrangement, recording is executed by the ordinary optical-thermomagnetic recording method. When the recorded bits are to be reproduced, it is necessary to initialize the direction of magnetization of the readout layer 30 so as to make it coincident with the predetermined direction (upward in FIG. 13) by applying an auxiliary magnetic field from an auxiliary magnetic field generating device 32. Then, by projecting a reproduction-use light beam 33 thereonto, the temperature of the recording layer 31 is locally raised and the magnetized information is copied onto the readout layer 30. Thus, only the information located in the central portion which has received the reproduction-use light beam and undergone a temperature rise, is reproduced. Accordingly, recorded bits with sizes smaller than that of the light beam are permitted to be read out.

However, in the above-mentioned conventional arrangement, prior to a reproducing operation, an auxiliary magnetic field needs to be applied from the auxiliary magnetic field generating device 32. Further, during reproduction, a recorded bit that has been copied onto the readout layer 30 from the recording layer 31 remains as it is even after the temperature of the portion has cooled off. When the light beam is shifted so as to reproduce the next recorded bit, the recorded bit previously copied still exists within the light beam, and this residual bit tends to be reproduced. This causes noise and thereby presents a problem in improving the recording density.

Now, there are two recording methods for magneto-optical recording disks, that is, the light modulation method and the magnetic field modulation method. In the light modulation method, the size of recorded bits is dependent on the size of a light spot. On the other hand, in the magnetic field modulation method, although the width of recorded bits is dependent on the size of a light spot, the length of the recorded bits is not dependent on the light spot but on the recording frequency of the magnetic field; therefore, recorded bits each of which is shorter than the diameter of the light spot can be formed. However, the recorded bits thus formed have a circular arc shape; this results in a problem that the shape is not suitable for reproduction by the use of a round-shaped light beam.

The inventors of the present application, therefore, have invented a magneto-optical recording medium wherein a readout layer having the following characteristics is formed on a recording layer (see Japanese Laid-Open Patent Application 3-85503):

(1) Exhibiting the in-plane magnetization characteristic at room temperature (here, the in-plane magnetization characteristic is a magnetic characteristic whereby the axis of easy magnetization becomes in parallel with the recording layer.)

(2) Having a Curie temperature that is substantially higher than that of the recording layer.

(3) Having a magnetic characteristic that is altered from the in-plane magnetization characteristic to the perpendicular magnetization characteristic when the temperature of the readout layer is raised above a predetermined temperature through irradiation of a light beam, and thereby the magnetization direction of the readout layer becomes coincident with the magnetization direction of the recording layer.

Here, it still remains as one of technical subjects to provide an optical head device for reproducing information from such a magneto-optical recording medium.

SUMMARY OF THE INVENTION

It is an object of the present invention to provide an optical head device for reproducing recorded bits formed on a magneto-optical recording medium with a size shorter than the diameter of a light spot by the magnetic field modulation method.

It is another object of the present invention to provide an optical head device whereby quality of a signal obtained by reproducing a recorded bit with a size shorter than the diameter of a light spot can be improved.

In order to achieve the above objectives, the magneto-optical recording medium from which information is reproduced by the optical head device of the present invention has the following characteristics:

(1) Having a recording layer whereon information is magneto-optically recorded by the magnetic field modulation method.

(2) Having a readout layer with a Curie temperature that is substantially higher than that of the recording layer, wherein an axis of easy magnetization is parallel to the recording layer at room temperature, and varies to be perpendicular to the recording layer within a predetermined temperature range between room temperature and the Curie temperature.

(3) The readout layer being laminated on the recording layer, and located at the same side of a light source.

The optical head device of the present invention is characterized by possessing at least the following means:

(1) First irradiation means for irradiating the first light beam onto the readout layer to form the first light spot for raising the temperature of the readout layer.

(2) Second irradiation means for irradiating the second light beam to form the second light spot for detecting the magneto-optical effect of the readout layer.

Here, the second light spot is formed behind the first light spot with respect to the shift direction of the first light spot and the first and second light spots partially overlap on each other with a predetermined space kept between their centers.

In the above arrangement, the temperature distribution of a circular area formed by the first light spot on the readout layer exhibits a Gaussian distribution; therefore, the temperature increases from the circumferential portion toward the center of the circular area. Here, a magnetic characteristic whereby an axis of easy magnetization becomes parallel to the recording layer is referred to as the in-plane magnetization characteristic while a magnetic characteristic whereby an axis of easy magnetization becomes perpendicular to the recording layer is referred to as the perpendicular magnetization characteristic. Then, depending on the above-mentioned temperature distribution, within the circular area, a specific region appears, which has a temperature range equal to the predetermined temperature range, that is, the temperature range wherein the magnetic characteristic changes from the in-plane magnetization characteristic to the perpendicular magnetization characteristic. This specific region forms a ring shape in the vicinity of a predetermined radial position within the circular area.

On the other hand, when information is recorded on the recording layer with high density through the magnetic field modulation method, the recorded bit forms a section of a ring-shaped area. Therefore, the ring-shaped specific region having the perpendicular magnetization characteristic functions as a kind of window from which the recorded bits on the recording layer are read out. More specifically, the magnetization direction of the recording layer is copied onto the specific region by an exchange coupling force that is exerted between the readout layer and the recording layer.

In addition, since the specific region has the ring shape, at least the front portion and the rear portion of the specific region are related to the copying of the recorded bits in connection with the shift direction of the first light spot. For this reason, the second light spot is formed by the second irradiation means so that it is partially overlapped on the first light spot at a rear portion thereof. Consequently, only the recorded bit copied onto the rear portion of the specific region can be detected by the second light spot.

By the time the first and second light spots are shifted so as to reproduce the next recording bit, the temperature of the portion subjected to the previous reproduction has cooled off such that the magnetic characteristic changes from the perpendicular magnetization characteristic to the in-plane magnetization characteristic and the magneto-optical effect no longer appears. Accordingly, the adjoining bits or tracks are not reproduced due to the fact that they are masked by the readout layer; this makes it possible to obtain reproduced signals with high quality.

For a fuller understanding of the nature and advantages of the invention, reference should be made to the ensuing detailed description taken in conjunction with the accompanying drawings.

DESCRIPTION OF THE EMBODIMENTS

Referring to FIGS. 1 through 8, the following description will discuss one embodiment of the present invention.

Figure 2:
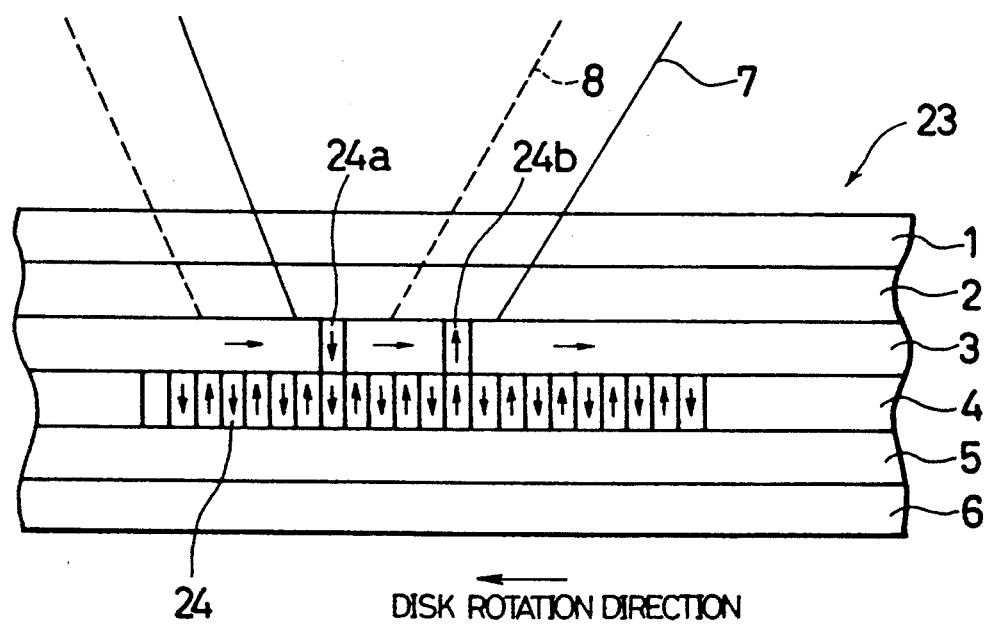
FIG. 2 is an explanatory drawing showing the principle of reproducing process of the optical head device of FIG. 1.

As shown in FIG. 2, a magneto-optical disk 23 (magneto-optical recording medium), which is reproduced by an optical head device of the present invention, is constituted of a substrate 1, a transparent dielectric film 2, a readout layer 3, a recording layer 4, a transparent dielectric film 5 and an overcoat film 6 that are laminated in this order.

Figure 3:
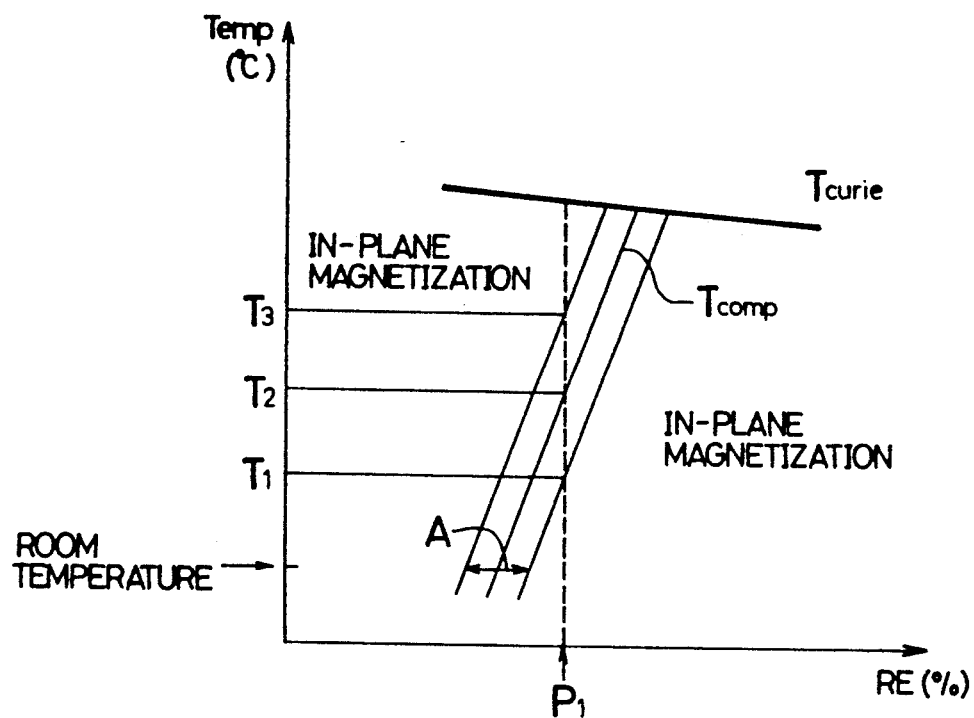
FIG. 3 is a drawing showing magnetic conditions of a readout layer for use with the optical head device of the present invention.
Figure 4:
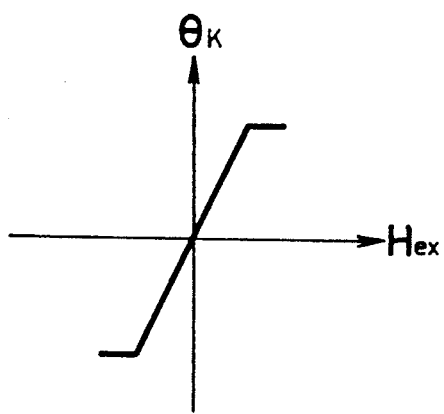
FIG. 4 is an explanatory drawing that indicates the relationship between the externally-applied magnetic field to be applied onto the readout layer having a composition $P_1$ of FIG. 3 and the magnetic Kerr rotation angle, from room temperature to temperature $T_1$.
Figure 5:
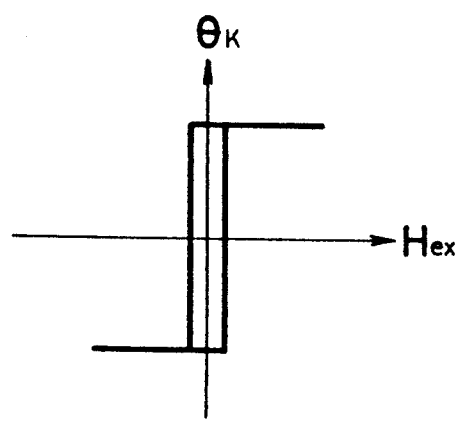
FIG. 5 is an explanatory drawing that indicates the relationship between the externally-applied magnetic field to be applied onto the readout layer having the composition $P_1$ of FIG. 3 and the magnetic Kerr rotation angle, from temperature $T_1$ to temperature $T_2$.
Figure 6:
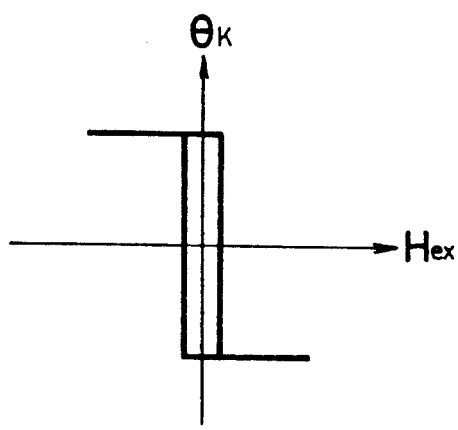
FIG. 6 is an explanatory drawing that indicates the relationship between the externally-applied magnetic field to be applied onto the readout layer having the composition of $P_1$ of FIG. 3 and the magnetic Kerr rotation angle, from temperature $T_2$ to temperature $T_3$.
Figure 7:
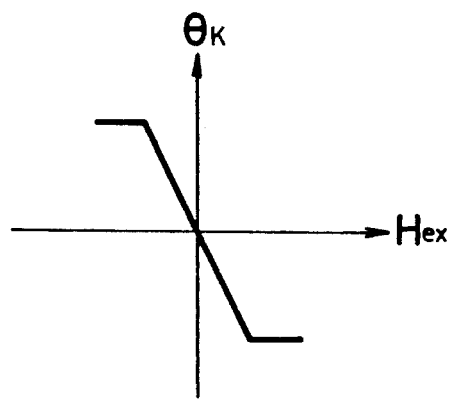
FIG. 7 is an explanatory drawing that indicates the relationship between the externally-applied magnetic field to be applied onto the readout layer having the composition $P_1$ of FIG. 3 and the magnetic Kerr rotation angle, from temperature $T_3$ to the Curie temperature $T_{curie}$.

FIG. 3 shows the magnetic condition of the rare-earth-transition-metal alloy for use as the read-out layer 3. In the graph, the range A represents a composition line wherein the rare-earth-transition-metal alloy exhibits perpendicular magnetic anisotropy (hereinafter, referred to as perpendicular magnetization characteristic). (Here, the horizontal axis of the graph in FIG. 3 represents the content ratio of the rare-earth metal.) This composition range A is extremely narrow, lying along the compensating composition. This is because the perpendicular magnetization characteristic only appears in the vicinity of the compensating temperature $T_{comp}$ where the magnetic moments of the rare-earth metal and the transition metal balance each other.

Here, the magnetic moments of the rare-earth metal and the transition metal are different from each other in their temperature characteristics; i.e., at high temperatures the magnetic moment of the transition metal is greater than that of the rare-earth metal.

Accordingly, the content of the rare-earth metal is set to be greater than that of the compensating composition such that, at room temperature, an axis of easy magnetization of the readout layer 3 does not become perpendicular to the recording layer 4 but becomes parallel to the recording layer 4. When a temperature rise has occurred in an area being subjected to a heating-use light beam, the magnetic moment of the transition metal becomes relatively greater until it balances the magnetic moment of the rare-earth metal. In this case, the area of the rare-earth-transition-metal alloy comes to exhibit the perpendicular magnetization characteristic as a whole. In contrast to the perpendicular magnetization characteristic, the magnetization characteristic whereby the axis of easy magnetization of the readout layer 3 becomes parallel to the recording layer 4 is hereinafter referred to as the in-plane magnetization characteristic.

By employing a rare-earth-transition-metal alloy having such characteristics in constituting the readout layer 3, the recording density of the magneto-optical disk of the present embodiment can be greatly increased.

$P_1$ in FIG. 3 represents the composition of the readout layer 3. FIGS. 4 through 7 respectively show the relationships between the externally-applied magnetic field $H_{ex}$ that is applied to the readout layer 3 having the composition $P_1$ and the magnetic Kerr rotation angle $\theta_K$. That is, FIGS. 4 through 7 show the magnetic characteristics within respective ranges: from room temperature to temperature $T_1$; from temperature $T_1$ to temperature $T_2$; from temperature $T_2$ to temperature $T_3$; and from temperature $T_3$ to the Curie temperature $T_{curie}$. Here, the temperatures $T_1$ and $T_3$ respectively represent the lower limit and upper limit of the temperature range having perpendicular magnetization characteristic with respect to the composition $P_1$, while the temperature $T_2$ is the compensation temperature with respect to the composition $P_1$.

These graphs show that the readout layer 3 has an abruptly rising hysteresis characteristic within the range from temperature $T_1$ to temperature $T_3$; however, it has no hysteresis characteristic within the range from room temperature to temperature $T_1$ as well as within the range from temperature $T_3$ to the Curie temperature $T_{curie}$.

In the present embodiment, for example, $Gd_{0.28}(Fe_{0.8}Co_{0.2})_{0.72}$ is employed as the readout layer 3 having a thickness of 50 nm. Further, its Curie temperature is on the order of 300° C.–400° C. For the reason as described earlier, the content of the rare-earth metal is set to be greater than that of the compensating temperature at room temperature such that a compensation temperature is marked in the vicinity of 100° C. (preferably, in the vicinity of 70° C.).

On the other hand, $(Gd_{0.6}Tb_{0.4})_{0.25}Fe_{0.75}$ is employed as the recording layer 4 having a thickness of 20 nm.

The transparent dielectric film 2 for enhancing the magneto-optical effect of the readout layer 3 is made of a dielectric film of AlN, SiN or AlNSiN, and its film thickness is set to be a value that is obtained by dividing one-fourth of the wavelength of a reproduction-use light beam by the refractive index. For example, assuming that the wavelength of a reproduction-use light beam is 800 nm, the film thickness of the transparent dielectric film 2 is on the order of 10 nm–80 nm. Moreover, the transparent dielectric film 5 is a protective film made up of a nitride with a thickness of 50 nm.

Figure 1:
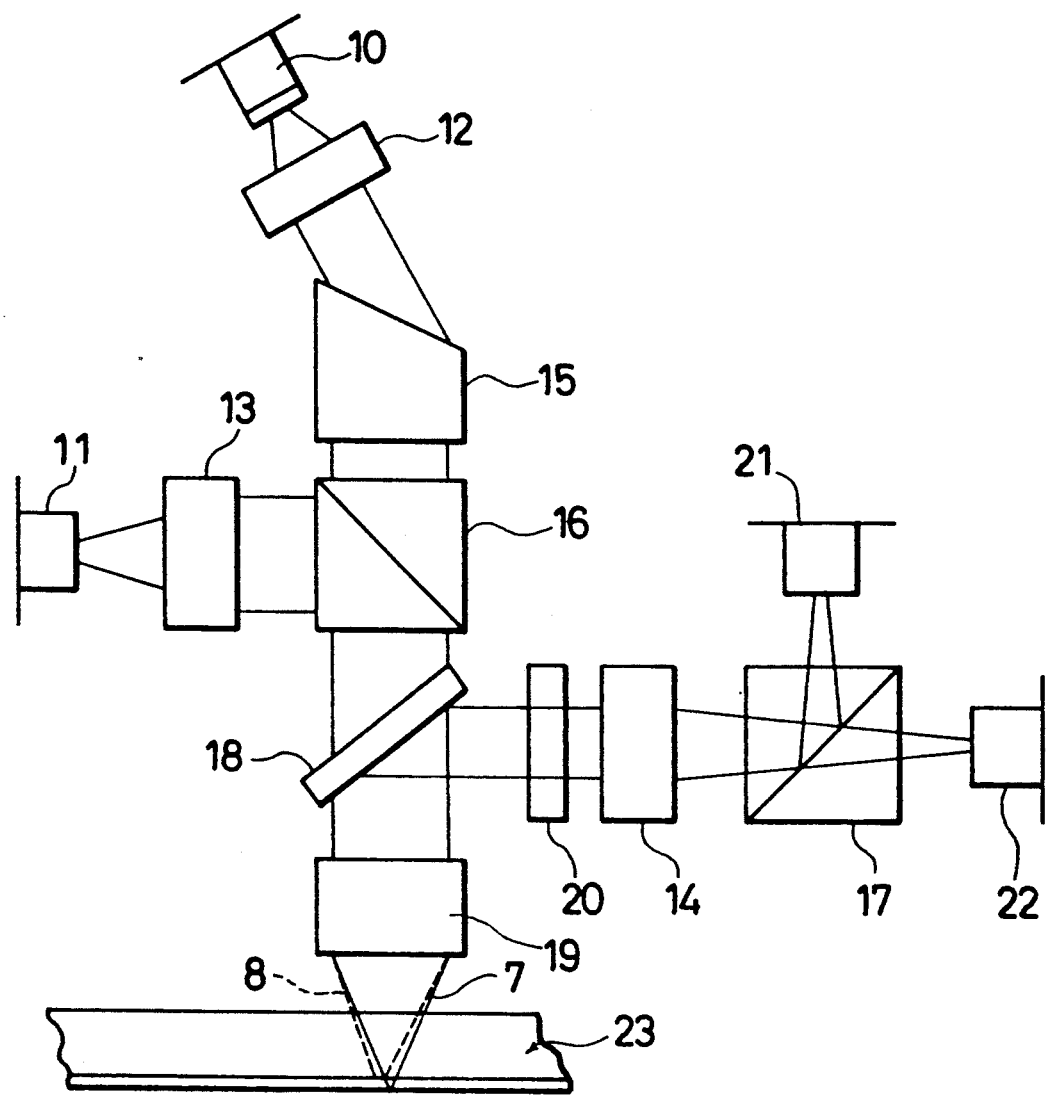
FIG. 1 is a schematic view showing a structural example of an optical head device of the present invention.

Next, referring to FIG. 1, the following description will discuss an optical head device of the present invention. The optical head device is constituted by semiconductor lasers 10 and 11 for emitting laser beams, collimating lenses 12, 13 and 14 for collimating the incident laser beams, a prism 15 for correcting an elliptical beam into a round beam, polarizing-beam splitters (PBS) 16 and 17, a wavelength separation mirror 18, a collimating lens 19, a ½ wavelength plate 20 for rotating the plane of polarization of a light beam by 45°, and photo-detectors 21 and 22 whose outputs are connected to respective differential amplifiers (not shown).

Especially, in this arrangement, the laser beams having different wavelengths from each other are set to be orthogonal to each other in their polarizing directions. Further, the wavelength separation mirror 18 separates a reflected-light path from the magneto-optical disk 23 to the PBS 17 and an impinging-light path from the semiconductor lasers 10 and 11 to the magneto-optical disk 23. The wavelength separation mirror 18 also selectively directs only the reflected light containing reproduced information (derived from a light beam 8 that will be described later) toward the ½ wavelength plate 20.

In the above optical head device, the first irradiation means, which produces a heating-use light beam 7 to form the first light spot on the magneto-optical disk 23, includes the semiconductor laser 10, the collimating lens 12, the prism 15, the PBS 16, the wavelength separation mirror 18 and the converging lens 19.

On the other hand, the second irradiation means, which produces the reproduction-use light beam 8 to form the second light spot on the magneto-optical disk 23, includes the semiconductor laser 11, the collimating lens 13, the PBS 16, the wavelength separation mirror 18 and the converging lens 19. Here, the light axes of the first and second irradiation means are respectively arranged such that the converging positions of the light beam 7 and the light beam 8 are slightly deviated from each other, which will be explained later.

In the above arrangement, laser beams emitted from the semiconductor lasers 10 and 11 are synthesized by the PBS 16, with their polarization directions being orthogonal to each other, to form the heating-use light beam 7 and the reproduction-use light beam 8 which are projected onto the magneto-optical disk 23 through the wavelength separation mirror 18 and the converging lens 19. The light beam 7 and the light beam 8 have different wavelengths from each other; therefore, with respect to reflected light beams from the magneto-optical disk 23 that have passed through the converging lens 19, only the reflected light beam derived from the light beam 8 is selectively directed onto the ¼ wavelength plate 20 by the wavelength separation mirror 18, and then converged onto the photodetectors 21 and 22 through the ¼ wavelength plate 20. The reflected light beam derived from the light beam 8 is tilted by 45° by the ¼ wavelength plate 20, and then directed to the PBS 17 through the collimating lens 14. In the PBS 17 polarizing components, which are orthogonal to each other, are extracted and the polarizing components are directed to the photodetectors 21 and 22 respectively. Information of the magneto-optical disk 23 is detected by finding the difference of outputs of the photodetectors 21 and 22 that is derived from the intensity variation of the polarizing components.

Additionally, the wavelength of the light beam 7 is 830 nm and that of the light beam 8 is 780 nm.

The following description will discuss the principle of information reproduction of the above-mentioned optical head device. Assume now that information is recorded on the recording layer 4 by the magnetic field modulation method in the form of perpendicular magnetization, for example, in the direction shown in FIG. 2. When the light beam 7 is converged onto the readout layer 3 from the substrate 1 side through the converging lens 19, the temperature of the readout layer 3 increases in the vicinity of the center of the first light spot that is formed on the readout layer 3 by the light beam 7.

In this case, the reproduction-use light beam 7 is converged to a diffraction limit by the converging lens 19 such that the light intensity distribution shows a Gaussian distribution; therefore the temperature distribution of the region having the first light spot also exhibits a Gaussian distribution. As a result, the temperature of a ring-shaped specific region on the readout layer 3 increases up around 70° C. that is the compensation temperature. On the other hand, the temperature of the outside of the specific region does not increase, and the temperature of the inside of the specific region extremely exceeds the compensation temperature.

Consequently, as illustrated in FIG. 3, the magnetic characteristic of the ring-shaped specific region has a transition from the in-plane magnetization characteristic to the perpendicular magnetization characteristic, while the in-plane magnetization characteristic is maintained outside the ring-shaped specific region and the in-plane magnetization characteristic finally appears inside the specific region. Therefore, no other regions except the ring-shaped specific region exhibit magneto-optical effect with respect to the perpendicularly incident light beams.

Figure 8:
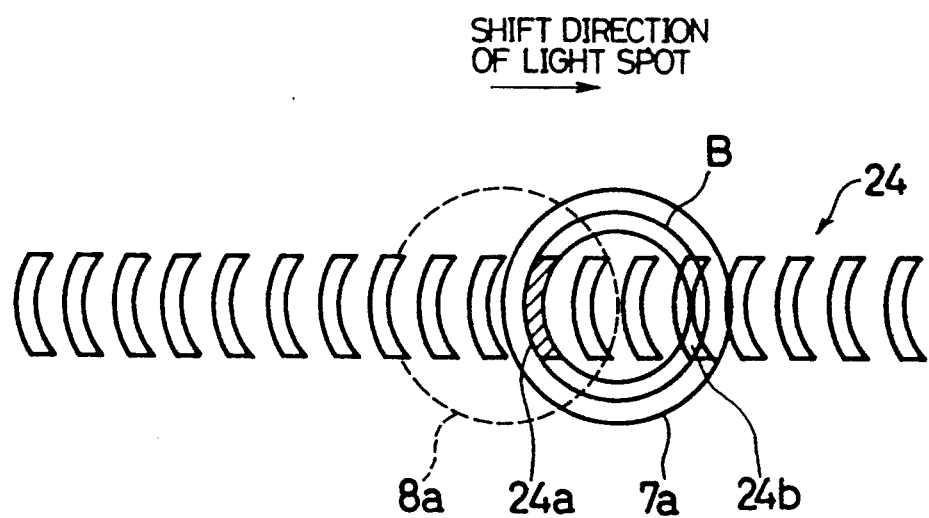
FIG. 8 is a schematic plan view showing the positional relationship between a light beam of FIG. 2 and recorded bits.

FIG. 8 shows positional relationships among recorded bits 24 formed on the recording layer 4 in response to binary information, the first light spot 7a created by the heating-use light beam 7, a perpendicularly magnetized region B corresponding to the ring-shaped specific region, and the second light spot 8a created by the reproduction-use light beam 8.

These recorded bits 24 are individually read out while being irradiated by the second light spot 8a in such a manner as will be described hereinbelow.

Each of the recorded bits 24 created through the magnetic field modulation method with high density has a part-of-ring shape. That is, the curvature of each of the recorded bits 24 is virtually equal to that of the perpendicularly magnetized region B. Therefore, the magnetization direction of one recorded bit 24 is virtually copied within the rear section of the perpendicularly magnetized region B with respect to the shift direction of the first light spot 7a by an exchange coupling force between the readout layer 3 and the recording layer 4.

On the other hand, since the perpendicularly magnetized region B is ring-shaped, at least its front section and rear section can be related to the copying of the recorded bits 24. Here, if the second light spot 8a was formed onto the first light spot 7a overlapping exactly thereon, a recorded bit 24b copied at the front section of the perpendicularly magnetized section B would produce noise. Therefore, as described in the present invention, it is important to form the reproduction-use second light spot 8a on the rear side of the first light spot 7a with respect to the shift direction thereof, with a predetermined space therefrom, so as to partially overlap the rear section of the first light spot 7a. With this arrangement, only the desired information of the recorded bit 24a thus copied onto the rear side of the perpendicularly magnetized region B can be read out by the use of the reproduction-use light beam 8 that has a different wavelength from that of the light beam 7.

Moreover, by the time the light beam 7 is shifted so as to reproduce the next recording bit, the temperature of the region previously reproduced has cooled off and the magnetic characteristic therein returns from the perpendicular magnetization to the in-plane magnetization. Accordingly, the region having the temperature drop no longer exhibits the magneto-optical Kerr effect. In other words, a recorded bit 24a, which has been once read out and copied onto the readout layer 3 through a window B, that is, the perpendicularly magnetized region B having a temperature rise around the compensation temperature, disappears after the window has been shifted together with the passage of the first light spot 7a. Consequently, only the information of the recorded bit 24 that has been read out through the window is reproduced by the use of the light beam 8; therefore, interference by signals from the adjoining bits, which causes noise, is eliminated. Further, crosstalk from the adjoining tracks can be reduced since recorded bits of the adjoining tracks are masked by the readout layer 3 that exhibits the in-plane magnetization characteristic.

Therefore, by using the optical head device of the present invention, the circular-arc-shaped recorded bits 24 can be reproduced with excellent signal quality without having adverse effects from the adjoining bits and the adjoining tracks while still employing the round-shaped light beam. In principle, the recording density can be increased to the capacity limit of the magneto-optical recording medium. Further, it is not necessary to install an auxiliary magnetic field generating device that has been used in the prior art systems for the initialization prior to the reproducing operation; this results in efficient reproduction.

Here, the material of the recording layer 4 is not necessarily limited to the aforementioned $Gd_{0.6}Tb_{0.4})_{0.25}Fe_{0.75}$. $Dy_{0.23}(Fe_{0.8}Co_{0.2})_{0.77}$ may be employed. $Dy_{0.23}(Fe_{0.8}Co_{0.2})_{0.77}$ can provide a greater coercive force than $(Gd_{0.6}TB_{0.4})_{0.25}Fe_{0.75}$; thus, the stability of the recorded bits is enhanced in addition to the above-mentioned advantages. Moreover, since Dy is available more easily at lower costs in comparison with Tb, cost reduction can be achieved.

Figure 9:
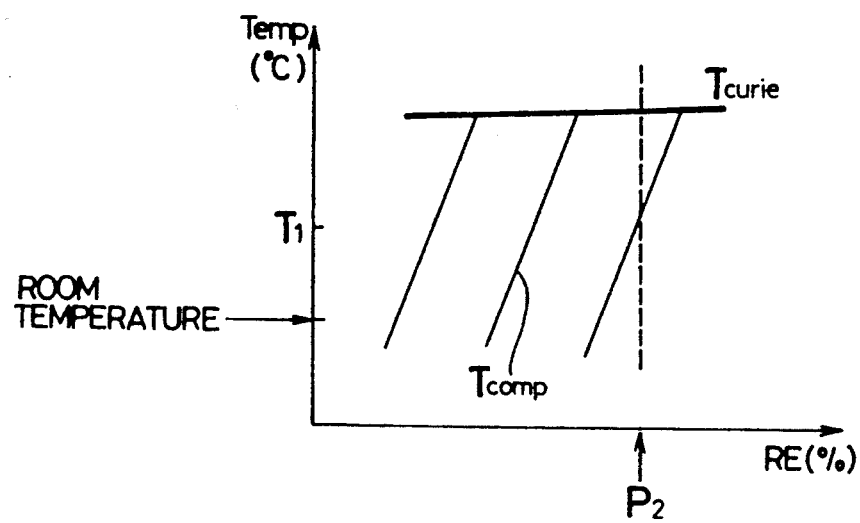
FIG. 9 is a drawing showing magnetic conditions of a readout layer of another magneto-optical recording medium for use with the optical head device of the present invention.

Further, the material of the readout layer 3 is not necessarily limited to the aforementioned $Gd_{0.28}(Fe_{0.8}Co_{0.2})_{0.72}$; materials such as GdTbFe, TbFeCo and DyFeCo may be employed. In the case of employing these materials with a high coercive force, whose magnetization characteristic is characterized by having a larger composition range to exhibit the perpendicular magnetization characteristic as shown in FIG. 9, it is necessary to select such compositions as to contain more rare-earth metal than that of the composition wherein the compensation temperature equals to the Curie temperature $T_{curie}$ and to exhibit the in-plane magnetization characteristic at room temperature and the perpendicular magnetization characteristic at high temperature.

Figure 10:
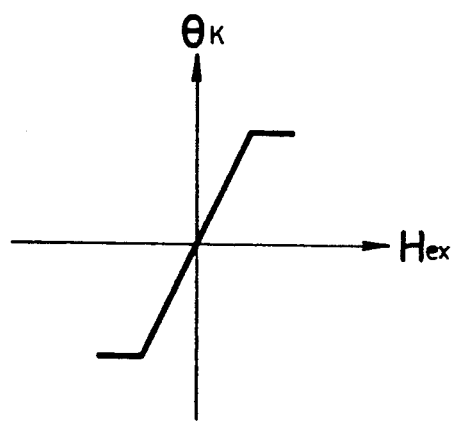
FIG. 10 is an explanatory drawing that indicates the relationship between the externally-applied magnetic field to be applied onto the readout layer having a composition $P_2$ of FIG. 9 and the magnetic Kerr rotation angle, from room temperature to temperature $T_1$.
Figure 11:
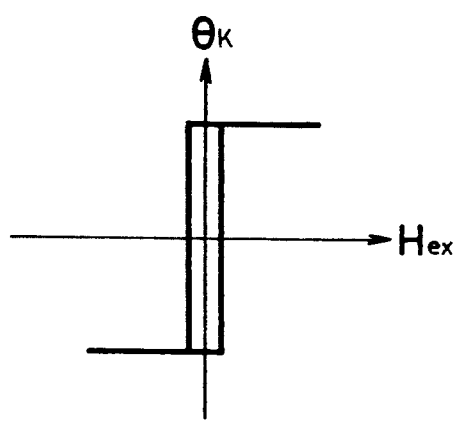
FIG. 11 is an explanatory drawing that indicates the relationship between the externally-applied magnetic field to be applied onto the readout layer having the composition $P_2$ of FIG. 9 and the magnetic Kerr rotation angle, from temperature $T_1$ to the Curie temperature $T_{curie}$.
Figure 12:
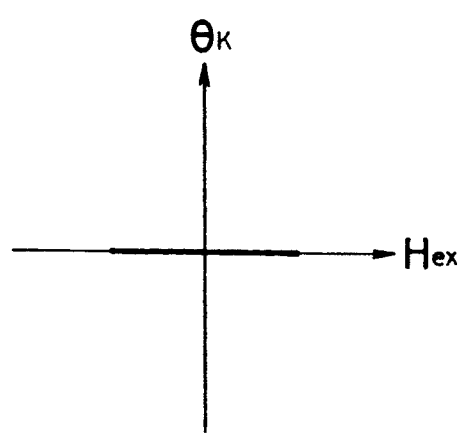
FIG. 12 is an explanatory drawing that indicates the relationship between the externally-applied magnetic field to be applied onto the readout layer having the composition of $P_2$ of FIG. 9 and the magnetic Kerr rotation angle above the Curie temperature $T_{curie}$.
Figure 13:
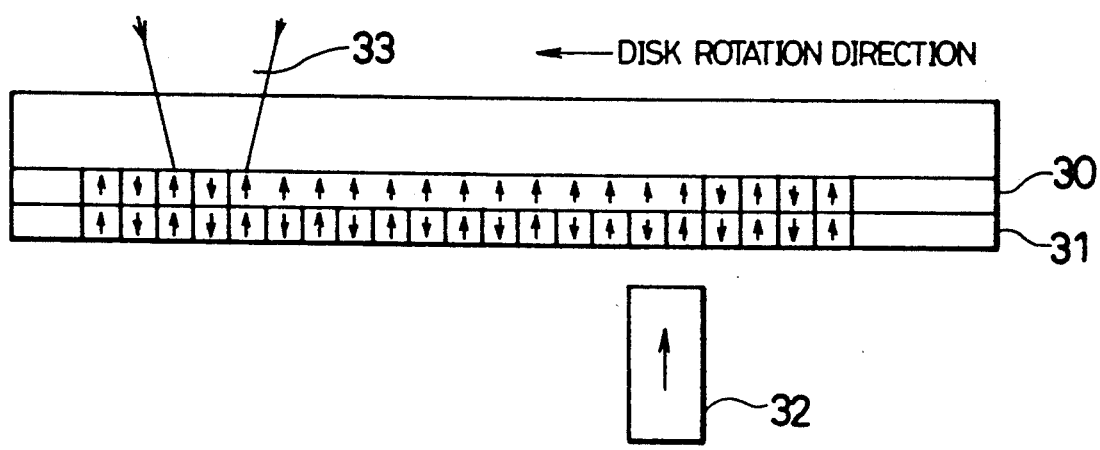
FIG. 13 is an explanatory drawing showing a reproducing operation with respect to a prior art magneto-optical disk.

Concerning a composition P2 satisfying the above requirements, FIGS. 10 through 12 respectively show hysteresis characteristics, that is, the relationships between the externally-applied magnetic field $H_{ex}$ that is applied to the readout layer 3 and the magnetic Kerr rotation angle $\theta_K$. That is, FIGS. 10 through 12 show the magnetic characteristics within respective ranges: from room temperature to temperature $T_1$; from temperature $T_1$ to the Curie temperature $T_{curie}$; and above the Curie temperature $T_{curie}$. These graphs show that the readout layer 3 has an abruptly rising hysteresis characteristic within the range from temperature $T_1$ to the Curie temperature $T_{curie}$; however, it has no hysteresis characteristic within the range from room temperature to temperature $T_1$ as well as the range above the Curie temperature $T_{curie}$. Here, the Curie temperature $T_{curie}$ corresponds to temperature $T_3$ of FIG. 3.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical head device for reproducing information from a magneto-optical recording medium in combination therewith, said medium comprises a recording layer whereon information is magneto-optically recorded by a magnetic field modulation method and a readout layer with a Curie temperature that is substantially higher than that of the recording layer, the readout layer having a direction of magnetization that is a parallel to the recording layer at room temperature, and that changes to be perpendicular to the recording layer within a predetermined temperature range between room temperature and the Curie temperature, the optical head device comprising:

a first irradiation means for irradiating the readout layer with a first light beam to form a first shifting light spot for raising the temperature of the readout layer; and a second irradiation means for irradiating the readout layer with a second light beam to form a second shifting light spot for detecting the magneto-optical effect of the readout layer, the second light spot being formed behind the first light spot with respect to a shift direction of the first light spot, the first and second light spots having predetermined diameters partially overlapping on each other with a predetermined space kept between their centers.

2. The optical head device as set forth in claim 1, wherein the first irradiation means comprises a first light source means for emitting the first light beam with a first wavelength and the second irradiation means comprises a second light source means for emitting the second light beam with a second wavelength.

3. The optical head device as set forth in claim 1, wherein the first irradiation means comprises beam shaping means for shaping the first light beam into a round shape in its cross section, the first light spot thereby being rounded in its outline.

4. The optical head device as set forth in claim 1, further comprising:

detection means for detecting the magneto-optical effect of the readout layer by using a reflected light beam from the magneto-optical recording medium, the reflected light beam being derived from the second light beam; and wavelength separation means for directing only the reflected light beam to the detection means in accordance with a wavelength of the reflected light beam.

5. An optical head device for reproducing information from a magneto-optical recording medium which comprises a recording layer whereon information is magneto-optically recorded by a magnetic field modulation method and a readout layer with a Curie temperature that is substantially higher than that of the recording layer, the readout layer having a direction of magnetizing that is parallel to the recording layer at room temperature, and that changes to be perpendicular to the recording layer within a predetermined temperature range between room temperature and the Curie temperature, the optical head device comprising:

a first irradiation means for irradiating the readout layer with a first light beam to form a first shifting light spot for raising the temperature of the readout layer; and a second irradiation means for irradiating the readout layer with a second light beam to form a second shifting light spot for detecting the magneto-optical effect of the readout layer, the second light spot being formed behind the first light spot with respect to a shift direction of the first light spot, the first and second light spots having predetermined diameters partially overlapping on each other with a predetermined space kept between their centers, detection means for detecting the magneto-optical effect of the readout layer by using a reflected light beam from the magneto-optical recording medium, the reflected light beam being derived from the second light beam; and wavelength separation means for directing only the reflected light beam to the detection means in accordance with a wavelength of the reflected light beam; and wherein the detection means comprises a polarization separation means for extracting two polarizing components orthogonal to each other from the reflected light and a light intensity detection means for detecting an intensity variation of at least one of the polarizing components.

6. The optical head device as set forth in claim 5, wherein the detection means further comprises ½ wavelength plate means for rotating the plane of polarization of the reflected light by 45° and the light intensity detection means comprises two photodetectors for detecting respective intensity variations of the polarizing components, the photodetectors being arranged to provide an reproduction output of the information through a difference of respective outputs thereof.

7. An optical head device for reproducing information from a magneto-optical recording medium which comprises a recording layer whereon information is magneto-optically recorded by a magnetic field modulation method and a readout layer with a Curie temperature that is substantially higher than that of the recording layer, the readout layer having a direction of magnetizing that is parallel to the recording layer at room temperature, and that changes to be perpendicular to the recording layer within a predetermined temperature range between room temperature and the Curie temperature, the optical head device comprising:

a first irradiation means for irradiating the readout layer with a first light beam to form a first shifting light spot for raising the temperature of the readout layer; and a second irradiation means for irradiating the readout layer with a second light beam to form a second shifting light spot for detecting the magneto-optical effect of the readout layer, the second light spot being formed behind the first light spot with respect to a shift direction of the first light spot, the first and second light spots having predetermined diameters partially overlapping on each other with a predetermined space kept between their centers and wherein the first irradiation means comprises a first light source means for emitting a first light beam with a first wavelength and the second irradiation means comprises a second light source means for emitting second light beam with a second wavelength, the second wavelength being different from the first wavelength the first light beam and the second light beam being arranged such that a plane of polarization of the first light beam is orthogonal to that of the second light beam.

8. The optical head device as set forth in claim 7, wherein the first irradiation means and the second irradiation means comprise an objective lens means for converging the first light beam and the second light beam onto the readout layer and a polarizing-beam splitter means for synthesizing the first light beam and the second light beam to direct them to the objective lens means, the objective lens means being shared by the first irradiation means and the second irradiation means, the first irradiation means and the second irradiation means being arranged in their light axes such that centers of the first light spot and the second light spot are located to keep the predetermined space.

9. An optical head device for reproducing information from a magneto-optical recording medium which comprises a recording layer whereon information is magneto-optically recorded by a magnetic field modulation method and a readout layer with a Curie temperature that is substantially higher than that of the recording layer, the readout layer having a direction of magnetizing that is parallel to the recording layer at room temperature, and that changes to be perpendicular to the recording layer within a predetermined temperature range between room temperature and the Curie temperature, the optical head device comprising:

a first irradiation means for irradiating the readout layer with a first light beam to form a first shifting light spot for raising the temperature of the readout layer; and a second irradiation means for irradiating the readout layer with a second light beam to form a second shifting light spot for detecting the magneto-optical effect of the readout layer, the second light spot being formed behind the first light spot with respect to a shift direction of the first light spot, the first and second light spots having predetermined diameters partially overlapping on each other with a predetermined space kept between their centers and wherein the first irradiation means comprises a light converging means for converging the first light beam such that the intensity distribution of the first light beam has a Gaussian distribution.

* * * * *